(12) United States Patent
Smick et al.

(10) Patent No.: US 6,271,530 B1
(45) Date of Patent: Aug. 7, 2001

(54) APPARATUS FOR REDUCING DISTORTION IN FLUID BEARING SURFACES

(75) Inventors: Theodore H. Smick, Essex; Marvin Farley, Ipswich; Takao Sakase, Rowley; Geoffrey Ryding, Manchester, all of MA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/293,954

(22) Filed: Apr. 19, 1999

(51) Int. Cl.$^7$ ............................... H01J 37/20; F16J 15/40
(52) U.S. Cl. ............................... 250/492.21; 250/441.11; 250/442.11; 277/913; 277/431; 384/131
(58) Field of Search ................... 250/492.21, 441.11, 250/442.11; 277/913, 927, 637, 431; 384/131

(56) References Cited

U.S. PATENT DOCUMENTS

| | | | |
|---|---|---|---|
| 4,586,830 | * | 5/1986 | Carter .................................. 284/121 |
| 5,003,183 | | 3/1991 | Nogami et al. .................... 250/492.2 |
| 5,133,561 | * | 7/1992 | Hattori et al. ............................ 277/3 |
| 5,229,615 | | 7/1993 | Brune et al. ....................... 250/492.2 |

FOREIGN PATENT DOCUMENTS

WO9913488   3/1999  (WO) .

* cited by examiner

*Primary Examiner*—Jack Berman
(74) *Attorney, Agent, or Firm*—Boult Wade Tennant (57) ABSTRACT

A fluid bearing and seal for an ion implanter is disclosed. The fluid bearing has a stator attached to a base and a moving member provided over the stator so that a fluid bearing can be formed between the opposing surfaces of the stator and the moving member. Either the base or the stator has a locating member extending normal to the bearing surface and the other one of either the base or the stator has a recess shaped to receive the locating member. A fluid seal enables the member to slide in the recess in the normal direction to seal off an enclosed volume between the member and the other one of either the stator or the base. A plurality of fixtures are distributed at points in a plane parallel to the bearing surface to fix the locating member and the other one of either the stator or the base together at these points to form the enclosed volume. The number of the fixtures is the minimum necessary so that the bearing surface of the stator remains undistorted. A fluid controller controls the supply of a fluid to the enclosed volume to maintain the planar bearing surface undistorted under the loading of the moving member.

24 Claims, 5 Drawing Sheets

APPARATUS FOR REDUCING DISTORTION IN FLUID BEARING SURFACES

FIELD OF THE INVENTION

This invention relates to an apparatus for reducing the distortion of the bearing surfaces of a fluid bearing such as a gas bearing. The invention relates in particular to an ion implanter having such apparatus.

BACKGROUND OF THE INVENTION

As will be familiar to those skilled in the art, in a typical ion implanter a relatively small cross-section beam of dopant ions is scanned relative to a silicon wafer. Traditionally, a batch of wafers was mechanically scanned in two directions relative to a fixed direction ion beam.

Single wafer processing has several advantages over batch processing, such as increased flexibility of implantation and a reduction in the potential costs should the implantation process fail, requiring the wafer to be discarded. Single wafer processing is particularly preferred for larger wafers having a diameter of 300 mm or more.

For single wafer processing, it is desirable mechanically to scan the silicon wafer in one direction whilst electrostatically or electromagnetically scanning or fanning the ion beam in a second direction.

U.S. Pat. Nos. 5,003,183 and 5,229,615 show examples of a variety of different scanning mechanisms which are known for this purpose. WO-A-99/13488 shows a further device suitable for allowing mechanical scanning of a single wafer. In the device of WO-A-99/13488, the wafer is mounted upon a substrate holder in a process chamber of an implantation device. Attached to, or integral with, the substrate holder is an arm which extends through an aperture in the wall of the vacuum chamber. Mechanical scanning is effected by a scanning mechanism located outside the process chamber. The scanning mechanism is connected with the arm of the substrate holder and allows movement of the arm (and hence the substrate holder) relative to the process chamber.

To facilitate movement of the moving parts of the scanning mechanism, one or more gas bearings are provided. For example, the end of the arm distal from the substrate support may be attached to a first bearing member which moves reciprocally relative to a second bearing member. This allows the wafer to be mechanically scanned in a plane orthogonal to the ion beam of the ion implanter. Movement of the first bearing member relative to the second bearing member is facilitated via a first gas bearing.

Likewise, the second bearing member may itself be rotatable relative to the process chamber to allow tilting of the substrate support relative to the direction of ion beam. The second bearing member rotates against a stator mounted upon a flange adjacent the aperture in the wall of the process chamber; a second gas bearing is employed between the stator and the surface of the second bearing member to facilitate this rotation.

For successful operation of the gas bearings, the bearing surfaces must each be flat. Variations in flatness of more than 10 µm or so can cause one of the bearing surfaces to touch the other bearing surface. Whilst the bearing surface of the second bearing member and that of the stator may be made flat to this accuracy, the exterior surface of flange on the process chamber wall adjacent to the aperture therein tends to be relatively uneven. Thus, when the stator is bolted or otherwise affixed to that flange, the clamping forces generated can distort the bearing surface of the stator. This problem is exacerbated by the presence of a vacuum within the vacuum chamber: the force of atmospheric pressure on the outside (non-bearing) surface of the second bearing member can also contribute to distortion of the stator.

It is an object of the present invention to address this problem. More generally, it is an object of the invention to reduce the problems associated with distortion of the bearing faces in a fluid bearing.

SUMMARY OF THE INVENTION

These and other objects are achieved by the provision of a fluid bearing comprising: (i) a base; (ii) a stator attached to the base providing a first planar fluid bearing surface extending in a direction of movement; (iii) a moving member having a second planar fluid bearing surface extending over said first surface, said moving member being mounted to be movable relative to said stator in said direction of movement, said first and second bearing surfaces being adapted to allow the second surface to be supported spaced from said first surface by a bearing fluid, one of said stator and said base having a locating member extending normal to the plane of said first bearing surface and the other of said stator and said base having a recess shaped to receive said locating member; (iv) a fluid seal enabling said member to slide in said channel in said normal direction sealing off an enclosed volume between said member and said other of said stator and said base; (v) a plurality of fixtures at respective points distributed in a plane parallel to said first bearing surface to fix said locating member and said other of said stator and said base together at said points to form said enclosed volume, the number of said fixtures being the minimum necessary so that the first planar bearing surface of the said stator remains undistorted, and a fluid controller controlling the supply of a fluid to said enclosed volume to maintain said first planar bearing surface undistorted under the loading of said moving member.

Supplying a fluid to a volume defined between the locating member and the base or the stator provides a "cushion" which minimizes the distortion influence of the base upon the stator. This in turn improves the flatness of the first planar fluid bearing surface of the stator relative to the second planar fluid bearing surface of the moving member. Thus, the moving member may move relative to the stator more easily. This is because the thickness of the fluid bearing layer may be reduced when both bearing surfaces are mutually very flat. Previously, in order to avoid the second bearing surface of the rotor from contacting the first bearing surface of the stator (which tended to be distorted), a thicker fluid bearing layer was necessary. Reducing the fluid bearing layer thickness provides several advantages.

Preferably, the locating member is generally U-shaped in section, and the recess is correspondingly generally U-shaped in section to receive the said locating member. Most preferably, the locating member is arranged substantially perpendicular to said normal direction, and a corresponding base of said generally U-shaped recess is also arranged substantially perpendicular to said normal direction, the said enclosed volume being defined between the said base of the locating member and the said base of the recess. This shape allows the locating member to extend in a normal direction whilst providing a significant area generally perpendicular to that normal direction to provide a corresponding significant volume for the fluid seal.

In one preferred embodiment, the locating member defines an enclosed annulus in a plane perpendicular to said normal direction. For example, the stator may be circular in a plane perpendicular to the normal direction, and the moving member may be a rotor arranged to rotate relative to said stator about an axis parallel to said normal direction.

The use of an annulus is preferred when the movable member is arranged to rotate relative to the stator, as the annular shape is particularly suitable for supporting the stator against any loading forces introduced by the movable member in that configuration.

In that case, it is preferable that there are three of the fixtures distributed about the plane parallel to the first bearing surface. Three represents the optimum number of fixtures in the case where the rotor is arranged to rotate relative to the stator, particularly when they are distributed equidistantly about the enclosed annulus.

Alternatively, the locating member may be enclosed and generally rectangular in a plane perpendicular to said normal direction. Such configuration is preferred when the moving member is moved in one or more linear directions relative to the stator, rather than rotating relative to it.

Preferably, the fluid bearing further comprises means for evacuating a chamber volume which is at least in part enclosed by the stator and the said second planar fluid bearing surface of the moving member.

In that case, preferably, the fluid bearing comprises a pressure transducer to measure the pressure within the said chamber volume, and a pressure control means to control the pressure of the said supply of fluid to the said enclosed volume in dependence upon the said measured pressure. This feedback control system allows the pressure of the fluid in the enclosed volume to be kept at the correct level to support the stator against bowing or dishing, even when the vacuum in the chamber volume changes (and thus the load presented by the moving member changes).

In a preferred embodiment, the base comprises a flange on the wall of an ion implanter process chamber.

Preferably, the fluid supplied to said enclosed volume is compressed air.

In a further aspect of the present invention, there is provided an ion implanter comprising: (i) an ion beam generator to generate a beam of ions to be implanted; (ii) a process chamber into which the ion beam is directed, the process chamber having a stator base thereon; (iii) a stator attached to the stator base providing a first planar fluid bearing surface extending in a direction of movement; (iv) a moving member having a second planar fluid bearing surface extending over said first surface, said moving member being mounted to be movable relative to said stator in said direction of movement, said first and second bearing surfaces being adapted to allow the second surface to be supported spaced from said first surface by a bearing fluid, one of said stator and said stator base having a locating member extending normal to the plane of said first bearing surface and the other of said stator and said stator base having a recess shaped to receive said locating member; (v) a fluid seal enabling said member to slide in said channel in said normal direction sealing off an enclosed volume between said member and said other of said stator and said stator base; (v) a plurality of fixtures at respective points distributed in a plane parallel to said first bearing surface to fix said locating member and said other of said stator and said stator base together at said points to form said enclosed volume, the number of said fixtures being the minimum necessary so that the first planar bearing surface of the said stator remains undistorted, and a fluid controller controlling the supply of a fluid to said enclosed volume to maintain said first planar bearing surface undistorted under the loading of said moving member.

The process chamber is typically evacuated and contains a substrate holder for a large single wafer. The substrate holder has an arm which extends through the rotor and into a reciprocating member. This reciprocating member preferably moves on a fluid bearing across a surface of the rotor which is outside the process chamber and is at atmospheric pressure. Movement of the reciprocating member provides for mechanical scanning of the substrate holder relative to an ion beam.

The rotor is able to rotate relative to the stator to adjust the angle of tilt of the substrate support relative to the ion beam. Once again, the use of a locating member attached either to the stator base or the stator and mountable within a recess upon the other of the stator base or stator, with a fluid seal to seal off an enclosed volume between the locating member and the recess significantly reduces the distorting forces on the stator. This in turn allows a reduction in the thickness of the fluid bearing which may be used between the stator and the rotor.

The invention may be put into practice in a number of ways, an embodiment of which will now be described by way of example only and with reference to the accompanying Figures in which.

Figure 1:
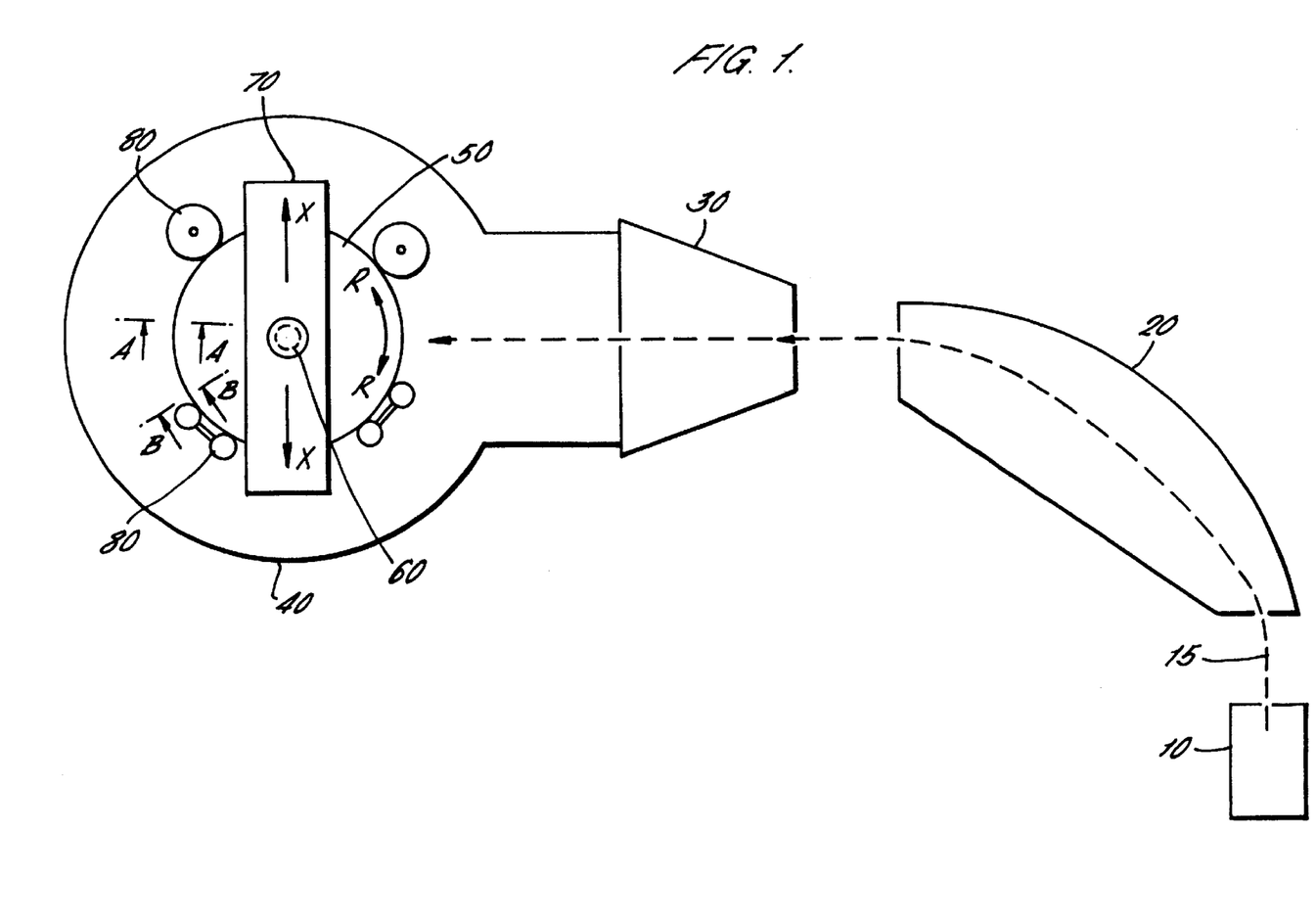
FIG. 1 shows a schematic side view of an ion implanter including a process chamber.

Referring first to FIG. 1, a schematic side view of an ion implanter is shown. The ion implanter includes an ion source 10 which is arranged to generate a (typically collimated) ion beam 15. The ion beam 15 is directed into a mass analyser 20 where ions of a desired mass/charge ratio are selected electromagnetically. Such techniques will be well known to those skilled in the art and will not be detailed further.

The ion beam 15 exits the mass analyser 20 in a generally collimated stream. The ion beam exiting the mass analyser may be subject to electrostatic acceleration or deceleration of the ions, depending upon the type of ions to be implanted and the desired implantation depth.

Downstream of the mass analyzer is a process chamber 40 containing a wafer to be implanted. In the present embodiment, the wafer is typically a large single wafer, approximately 300 mm in diameter.

The ion beam which exits the mass analyser 20 generally has a beam width and height which is substantially smaller than the diameter of the wafer to be implanted. In order to provide a uniform ion dose over the wafer, the beam needs to be scanned relative to the wafer. In the preferred embodiment, the ion beam is scanned electrostatically or electromagnetically in a first plane via an electrostatic/ electromagnetic scanner 30. In the present example, the ion beam is scanned in a single plane which extends into and out of the page when viewing FIG. 1. The wafer itself is scanned mechanically in a second direction orthogonal to the direction of scanning of the ion beam. To scan the wafer mechanically, the wafer is mounted upon a substrate support. This consists of a plate onto which the wafer is mounted within the process chamber 40, and an elongate arm connected to the plate.

The elongate arm extends in a direction generally parallel with the direction in which the ion beam scans out of the process chamber. The arm passes through a slot (not shown) in a rotor plate 50 which is mounted adjacent to a side wall of the process chamber 40. The end 60 of the scanning arm is mounted within a scanning member 70. To effect mechanical scanning of the scanning arm (and hence the wafer mounted upon the plate) relative to the electrostatically/ electromagnetically scanned ion beam, the scanning member 70 is movable in a reciprocating manner in the direction X shown in FIG. 1. To facilitate this scanning, the undersurface of the scanning member 70 is spaced from the upper surface of the rotor plate 50 by a cushion of compressed air which acts as an air bearing.

The scanning member 70 in FIG. 1 is shown in a vertical position such that the surface of the wafer is perpendicular to the plane of the scanned or fanned incident ion beam. However, it may be desirable to implant ions from the ion beam into the wafer at an angle. For this reason, the rotor plate 50 is rotatable about an axis defined through its centre, relative to the fixed wall of the process chamber 40. In other words, the rotor plate 50 is able to rotate in the direction R shown in FIG. 1.

As with the scanning member 70, movement of the rotor plate 50 relative to the wall of the process chamber is facilitated with an air bearing which lies between the lower surface of the rotor plate 50 and the upper surface of a stator (not shown in FIG. 1) mounted upon a flange extending from a wall of the process chamber 40. Radial movement of the rotor plate is constrained by a series of guide wheels 80 arranged around the circumference of the rotor plate 50. The inside of the process chamber is evacuated (to prevent contamination of the wafer and ion beam) and a large force (due to atmospheric pressure) accordingly acts to hold the rotor plate against the stator. It is this pressure differential which prevents unwanted axial movement of the rotor.

The mechanical scanning arrangement described above is described in further detail in commonly assigned U.S. patent application Ser. No. 08/926,650, filed Sep. 10, 1997, and in PCT/ the contents of which are hereby incorporated in their entirety by reference.

Figure 2:
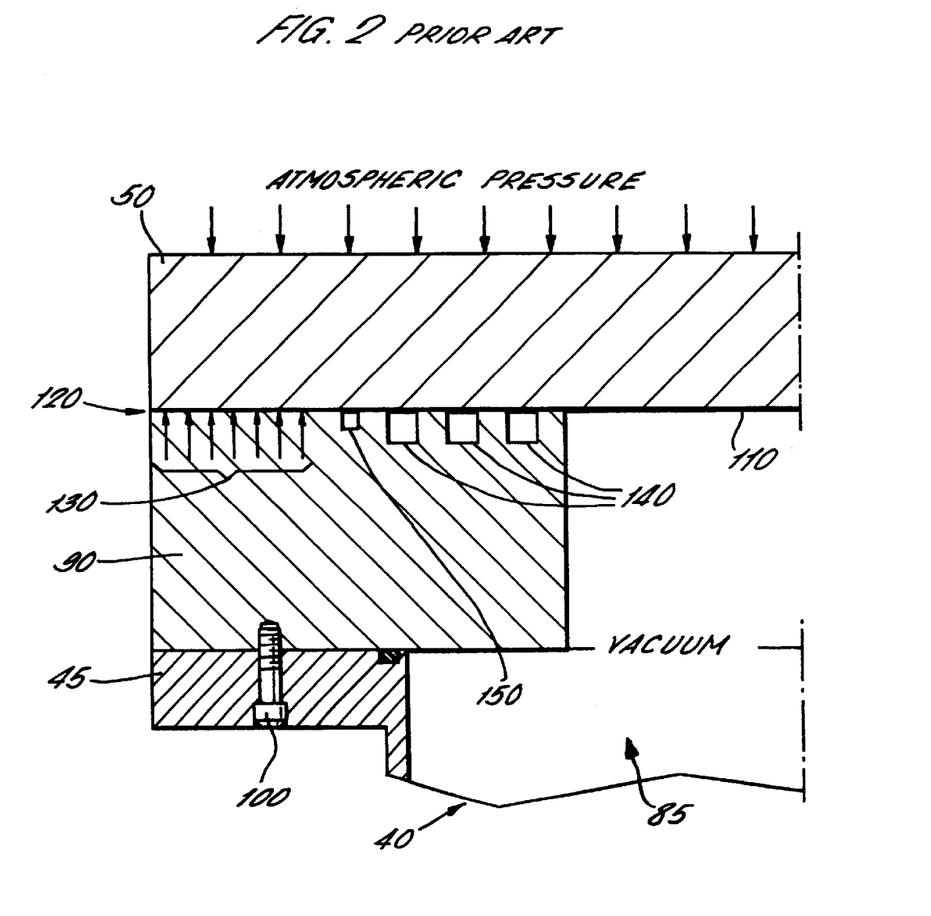
FIG. 2 shows a sectional view along the line A—A in the process chamber of FIG. 1, the process chamber including prior art apparatus.

Referring now to FIG. 2, a sectional view along the line A—A of the process chamber 40 of FIG. 1 is shown, in the case where the rotor plate and stator are mounted upon a flange extending from the wall of the process chamber 40 using a prior art arrangement.

The wall of process chamber 40 has a generally circular aperture (indicated by reference numeral 85 in FIG. 2) in it. An annular flange 45 extends around the edge of the circular aperture 85 in the wall of the process chamber 40. A stator 90, whose purpose will be described below, is affixed to the flange 45, the stator 90 being substantially coaxial with the axis of the circular aperture 85. Affixing of the stator 90 to the flange 45 is achieved by a mounting fastener 100, such as a bolt. This passes through an opening in the flange 45 and into a corresponding threaded opening in a lower surface of the stator 90. It will be understood that, in order to effect clamping of the stator 90 to the flange 45, a plurality of mounting fasteners 100 are employed around the circumference of the flange.

The rotor plate 50 lies above an upper surface of the stator 90. The rotor plate 50 acts as a closure for the process chamber 40. The lower surface 110 of the rotor plate 50 acts as a first bearing surface, and the upper surface of the stator 90 acts as a second bearing surface. A supply of compressed air (not shown in FIG. 2) is connected to a series of compressed air channels in the stator 90 which are indicated schematically by arrows 130 in FIG. 2. Application of compressed air to the compressed air channels 130 creates a compressed air bearing 120 between the bearing surfaces of the rotor plate 50 and the stator 90.

The process chamber 40 is evacuated. The upper surface of the rotor plate 50 is, however, at atmospheric pressure. To allow rotational movement of the rotor plate 50 relative to the stator 90 on the compressed air bearing 120, whilst maintaining a vacuum within the process chamber 40, a series of differential pumping channels 140 are provided. Such channels for permitting a vacuum to be maintained adjacent a gas bearing are known in the art and do not form part of the present invention. Briefly, however, the channels allow a graded pressure differential to be obtained between a first differential pumping channel 150, which is a vent to atmosphere, and a last differential pumping channel 140 which is at high vacuum.

In order for the rotor plate 50 to move smoothly over the stator 90, the thickness of the air bearing (i.e. the gap between the lower surface 110 of the rotor plate and the upper surface of the stator 90) needs to be highly uniform. A typical gap of 13 $\mu$m is desirable. Whilst it is possible without great difficulty to machine the lower surface 110 of the rotor plate 50, and the upper surface of the stator 90, to be flat to this degree, the flange 45 upon which the lower surface of the stator 90 is seated tends not to be as flat. The process chamber 40 itself is relatively large and it is accordingly not appropriate to attempt to machine the flange thereon to be flat to this degree. Thus, when the flange 90 is clamped to the process chamber wall 45 with the mounting fasteners 100, distortion forces arise. These in turn cause the upper surface of the stator 90 to be distorted relative to the lower surface 110 of the rotor plate 50.

Furthermore, distortion forces may arise due to the pressure differential between the upper surface of the rotor plate 50, at atmospheric pressure, and the lower surface 110 thereof, which is at a high vacuum (typically $10^{-4}$Pa or less).

Previously, in order to overcome the effect of these distortions, the pressure of the compressed air in the compressed air bearing 120 was increased so that the two bearing surfaces were unable to touch in use. A typical compressed air supply pressure of 80 p.s.i. (560 kPa) was needed to ensure this.

Figure 3:
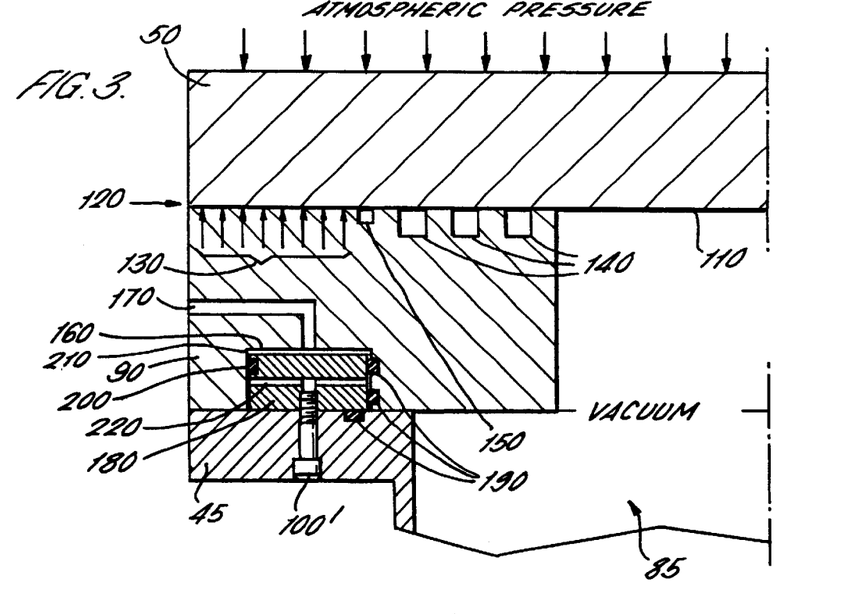
FIG. 3 shows a sectional view along the line A—A of the process chamber of FIG. 1, the process chamber including apparatus according to a preferred embodiment of the present invention.

Turning now to FIG. 3, a section along the line A—A of the process chamber of FIG. 1 is shown, with an apparatus embodying the present invention employed. Features common to FIGS. 2 and 3 are labelled with like reference numerals.

As with the arrangement of FIG. 2, a stator 90 is mounted upon the flange 45 which extends from the wall of the process chamber 40. The stator 90 again includes a plurality of compressed air channels 130 to supply compressed air to an air bearing between the stator 90 and a rotor plate 50. Likewise, the interior of the process chamber 40 is evacuated using differential pumping channels 140 and a vent to atmosphere 150 within the upper surface of the flange 90.

In contrast to the arrangement of FIG. 2, however, the stator 90 is not affixed directly to the flange 45. Instead, an annular recess 160 is formed within the lower surface of the stator 90. The recess 160 extends around the whole of the stator 90, and as shown in FIG. 3 is generally U-shaped in section.

A corresponding annular piston member 180 is mounted upon the flange 45. As with the annular recess 160, the annular piston member 180 extends around the circumference of the flange when mounted thereon.

The annular piston member 180 is attached to the flange 45 around the circumference of that flange using mounting fasteners 100', such as bolts. The number of mounting fasteners 100' employed is selected to ensure that the annular piston member is securely fastened to the flange. Alternative methods of attaching the annular piston member 180 to the flange 45, such as welding, will be apparent to the skilled person.

The radial width of the annular piston member 180 is slightly less than the radial width of the annular recess 160 so that the piston member 180 is a sliding fit within the annular recess 160. To create gas-tight seals, O-rings 190 are employed within channels in the walls of the annular recess 160 and in the flange 45 beneath the annular piston member 180. A further O-ring is employed in a channel formed around the outer radius of the annular piston member 180.

The base of the annular recess 160 opens into a compressed air line 170 which passes through the body of the stator 90 and out of a lateral wall thereof. The compressed air line 170 is connectable to a supply of compressed air (not shown).

In use, the annular recess in the stator is located over the annular piston member once the latter has been attached to the flange 45. Compressed air enters the compressed air line 170 and passes into a gas support region 210 which is defined between the upper surface of the annular piston member 180 and the base of the annular recess 160. The pressure of the compressed air supplied to the compressed air line 170 may be altered, but is chosen so as to prevent "dishing" or "bowing" of the stator under the load of the rotor plate 50. At the same time, whilst any distortions in the flange might be transmitted to the annular piston member, the gas support region 210 prevents the distortion induced by the flange from being transmitted to the stator. This will be described in more detail in connection with FIGS. 4 and 6 below.

Because the gas support region contains compressed air at a pressure higher than atmospheric pressure, a piston pressure vent 220 is provided within the annular piston member 180. This piston pressure vent 220 extends radially through the annular piston member as shown in FIG. 3.

To prevent distortion of the upper bearing surface of the stator 90 due to loading by the rotor plate when in use, it is necessary to locate the stator 90 relative to the flange 45 and the annular piston member 180. In the described embodiment, this is achieved using a plurality of locating bolts 105 as shown in FIG. 4.

The number of locating bolts necessary to avoid torsional force distortion on the stator is three, arranged equidistantly around the circumference of the annular piston member 180. Such an arrangement is shown in the partial cutaway plan view of FIG. 5. Of course, in other arrangements (for example, in an apparatus where linear as opposed to rotational movement of one bearing surface relative to another is to occur) different numbers of locating bolts may be employed.

Figure 4:
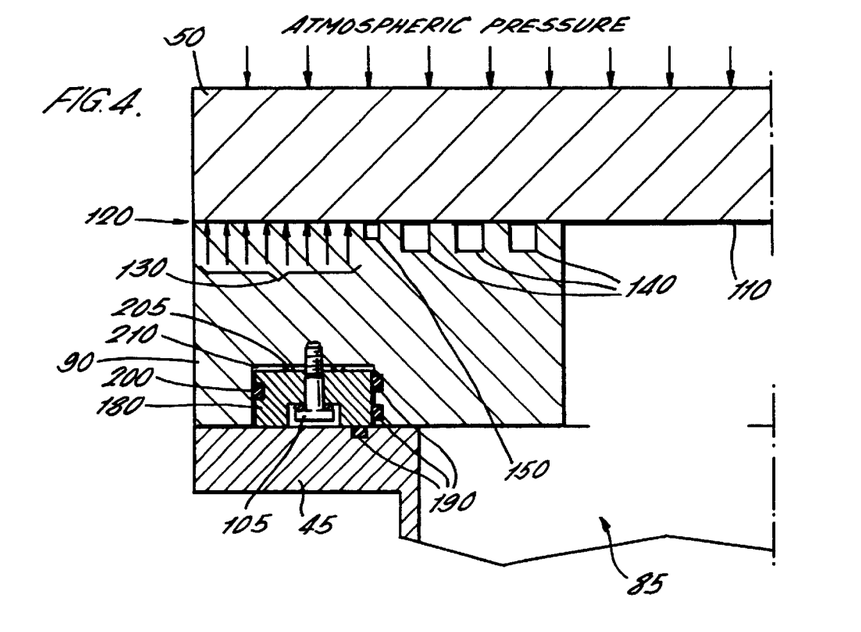
FIG. 4 shows a sectional view along the line B—B of the process chamber of FIG. 1, the process chamber including apparatus according to a preferred embodiment of the present invention.

FIG. 4 shows a sectional view along the line B—B of FIG. 1, again with the apparatus embodying the invention employed. FIG. 4 accordingly shows a view through a section of the flange 45, annular piston member 180, stator 90, and rotor plate 50 at the radial position of one of the three locator bolts 105.

As seen in FIG. 4, each locating bolt 105 consists of a threaded shank which is screwed into a corresponding hole through the annular piston member. In other words, the shank of the locating bolt is substantially normal to the upper surface of the annular piston member 180. A head of the locating bolt 105 seats within a chamfer in the lower surface of the annular piston member 180, and may be locked in place with a spring washer.

The end of the shank distal from the head of the locating bolt 105, extends through the upper surface of the annular piston member 180 into a corresponding threaded hole formed within the base of the annular recess in the stator 90. A spacer washer 205 is mounted around the shank of the locating bolt 105 and spaces the upper surface of the annular piston member 180 from the base of the annular recess. Before compressed air is forced into the gas support region, the three locator bolts 105 are screwed into the stator 90, and tightened until the base of the annular recess and the upper surface of the annular piston member co-operate to compress the spacer washer 205.

After the three locator bolts 105 have been screwed into the stator, compressed air may be fed into the gas support region. The pressure of the compressed air is adjusted so as to prevent 'bowing' or 'dishing' of the stator between the points where the locating bolts 105 are. This may be achieved using a control system, as will be described in connection with FIG. 6 below.

Figure 5:
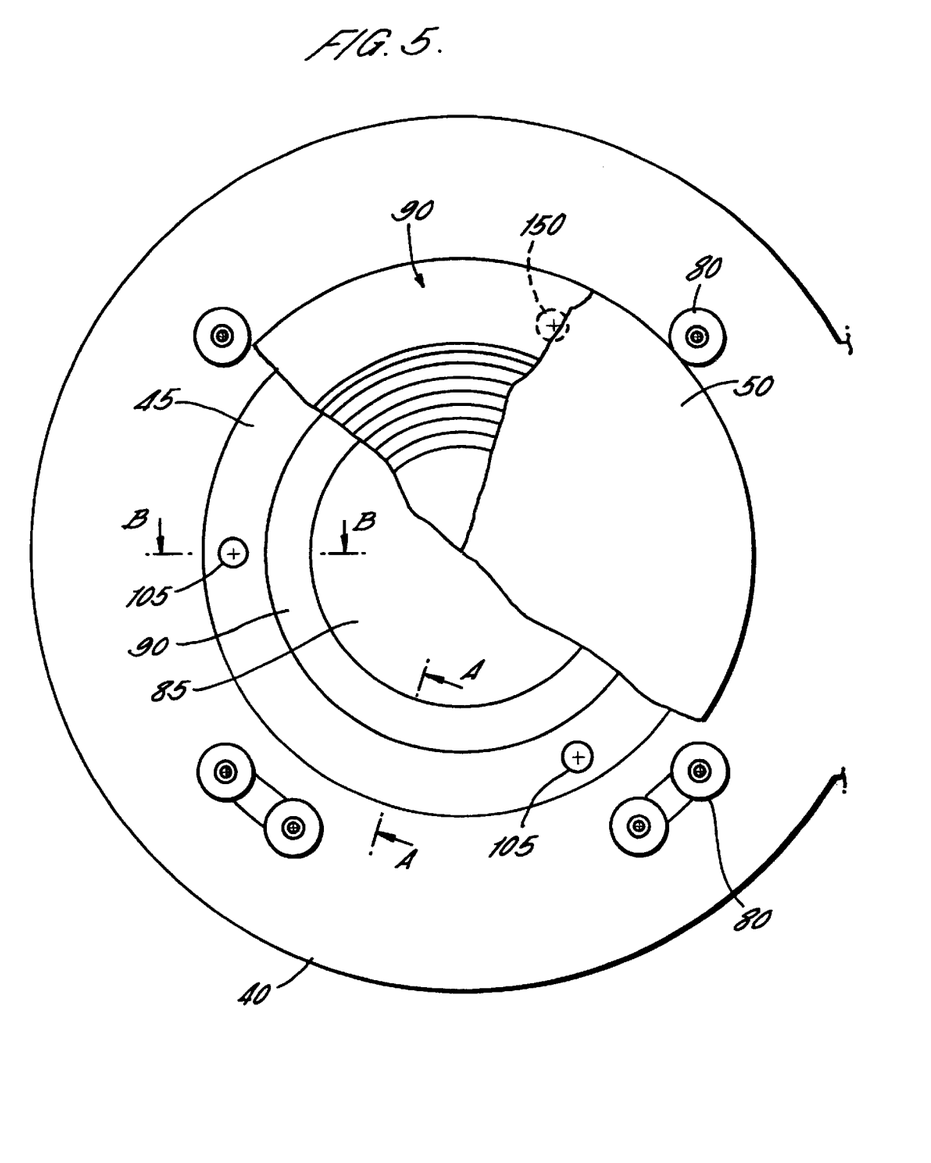
FIG. 5 shows a close-up side view, in partial cut-away, of the process chamber of FIG. 1, including the apparatus according to the preferred embodiment of the invention.

FIG. 5 shows, in partial cut-away, a close-up side view of the process chamber 40 shown in FIG. 1, with the apparatus of FIGS. 3 and 4 employed.

Figure 6:
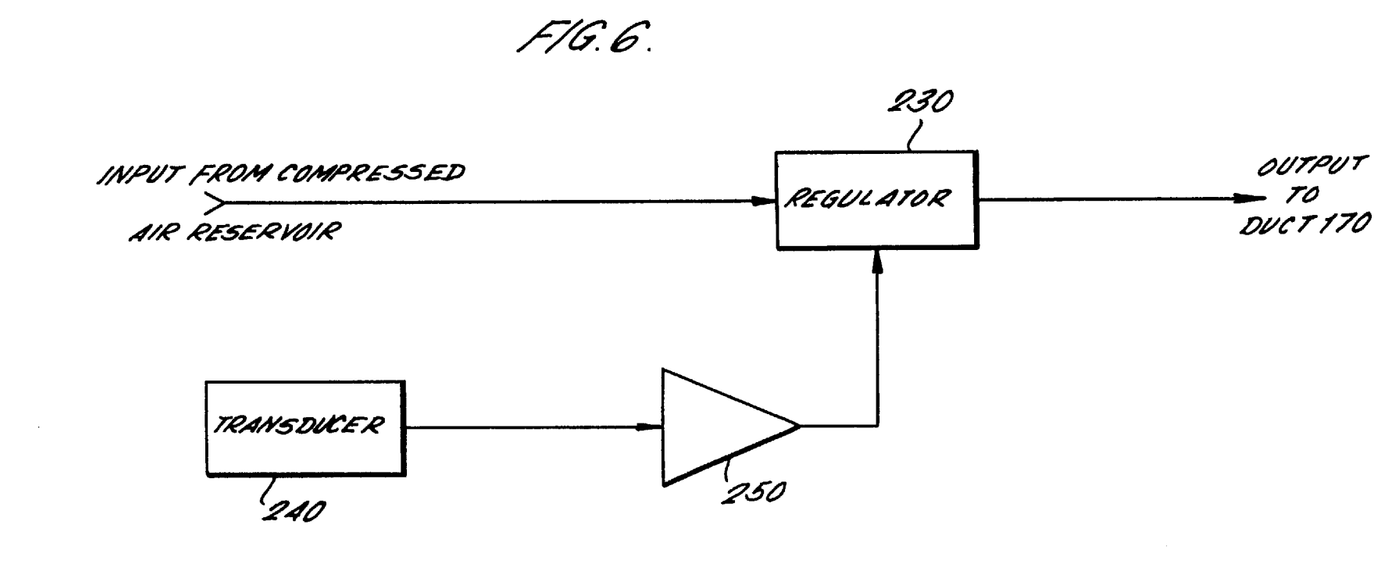
FIG. 6 shows a block diagram of a pressure control system for use with the apparatus of FIGS. 3, 4 and 5.

FIG. 6 shows a block diagram of a pressure control system which may be used to adjust the pressure of the compressed air within the gas support region 210. As seen in FIG. 6, a pressure regulator 230 receives as a first input a supply of compressed air from a compressed air reservoir (not shown). A pressure transducer 240 is located within the evacuated process chamber 40. The pressure transducer 240 measures the vacuum within the process chamber at a given time. The output of the pressure transducer 240 is amplified with an amplifier 250 and supplied as a second input to the pressure regulator 230. The measured pressure (i.e. the vacuum) within the process chamber is used to adjust the pressure of the incoming compressed air from the compressed air reservoir. The pressure of the compressed air which is output from the pressure regulator 230 to the compressed air line 170 and hence to the gas support region 210 is adjusted so as to counterbalance the opposing force caused by the action of atmospheric pressure upon the upper surface of the rotor plate 50. This system can be useful when the vacuum within the process chamber is changed, for example, when the chamber is vented to atmosphere for maintenance.

It is particularly desirable that the line of action of the force generated by the compressed air within the gas support region 210 is equal and opposite to the line of action of the force generated by atmospheric pressure on the upper surface of the rotor. Provided that these two forces are equal and opposite, any twist (i.e. "dishing") of the stator is minimized.

Specifically, a linear bearing could benefit from the above arrangement.

With the arrangement described above, the problem of distortion in the stator is significantly reduced. This in turn allows the thickness of the air bearing between the stator and the rotor to be reduced. For example, a supply pressure of only 20 p.s.i. (140 kPa) to the compressed air bearing 120 may be necessary.

It is to be understood that the pressure in the compressed air bearing is constant and in particular does not depend upon the thickness of air in it, for a constant load. Only the air flow rate is increased to maintain a constant pressure in the bearing as the gap of the air bearing increases. This is achieved by increasing the supply pressure of the compressed air to the air bearing.

Embodiments of the invention have been described in connection with a rotor plate, arranged to rotate upon an air bearing above a stator which is in turn mounted upon a flange in an ion implanter. However, it will be appreciated that the invention may be employed in other cases where it is desirable to reduce distortion of the bearing surfaces of a fluid bearing. As set out above, the scanning member 70 (FIG. 1) moves relative to the rotor plate 50 on a further air bearing and the apparatus is particularly preferred for employment in conjunction with that air bearing as well. The foregoing will enable those of ordinary skill to construct an arrangement which will prevent distortion of the air bearing between the rotor and the scanning member. For linear as opposed to rotational movement, it may be preferable for the piston member and the corresponding recess to be generally rectangular rather than annular. It will of course be understood that a conduit for compressed air must be lead across the rotor to the region where the scanning member 70 is located.

Indeed, the invention is not restricted to ion implanters and may be useful in other situations where it is desirable to avoid distortion forces so that two opposing bearing surfaces may be maintained flat relative to each other. For example, any device wherein linear motion on a fluid bearing occurs between two bearing surfaces may benefit from the arrangement set out herein.

Likewise, although in the described embodiments compressed air has been inserted into the gas support region, any suitable fluid may be used.

It will also be understood that the annular recess 160 of FIGS. 3 and 4 could equally be formed in the flange, with the annular piston member 180 mounted upon the stator. Such an arrangement requires that the flange 45 be thick enough to be recessed, of course. Furthermore, a part of the stator or base could itself act as the annular piston member.

Although the present invention has been described with reference to preferred embodiments, workers skilled in the art will recognize that changes may be made in form and detail without departing from the spirit and scope of the invention, which is to be determined in accordance with the appended claims.

What is claimed is:

1. A fluid bearing comprising:
   (i) a base;
   (ii) a stator attached to the base providing a first planar fluid bearing surface extending in a direction of movement;
   (iii) a moving member having a second planar fluid bearing surface extending over said first surface, said moving member being mounted to be movable relative to said stator in said direction of movement, said first and second bearing surfaces being adapted to allow the second surface to be supported spaced from said first surface by a bearing fluid, one of said stator and said base having a locating member extending normal to the plane of said first bearing surface and the other of said stator and said base having a recess shaped to receive said locating member;
   (iv) a fluid seal enabling said member to slide in said recess in said normal direction sealing off an enclosed volume between said member and said other of said stator and said base;
   (v) a plurality of fixtures at respective points distributed in a plane parallel to said first bearing surface to fix said locating member and said other of said stator and said base together at said points to form said enclosed volume, the number of said fixtures being the minimum necessary so that the first planar bearing surface of the said stator remains undistorted, and
   (vi) a fluid controller controlling the supply of a fluid to said enclosed volume to maintain said first planar bearing surface undistorted under the loading of said moving member.

2. The fluid bearing of claim 1, in which the locating member is generally U-shaped in section, and the recess is correspondingly generally U-shaped in section to receive the aid locating member.

3. The fluid bearing of claim 2, wherein a base of the U-shaped locating member is arranged substantially perpendicular to said normal direction, and a corresponding base of said generally U-shaped recess is also arranged substantially perpendicular to said normal direction, the said enclosed volume being defined between the said base of the locating member and the said base of the recess.

4. The fluid bearing of claim 1, in which the locating member defines an enclosed annulus in a plane perpendicular to said normal direction.

5. The fluid bearing of claim 4, in which the stator is circular in a plane perpendicular to said normal direction, and the moving member is a rotor arranged to rotate relative to said stator about an axis parallel to said normal direction.

6. The fluid bearing of claim 4, comprising three fixtures distributed in said plane parallel to said first bearing surface.

7. The fluid bearing of claim 6, wherein the three fixtures are distributed equidistantly around said enclosed annulus.

8. The fluid bearing of claim 1, in which the locating member is enclosed and is generally rectangular in a plane perpendicular to said normal direction.

9. The fluid bearing of claim 1, further comprising means for evacuating a chamber volume which is at least in part enclosed by the stator and the said second planar fluid bearing surface of the moving member.

10. The fluid bearing of claim 9, in which the fluid controller comprises a pressure transducer to measure the pressure within the said chamber volume, and a pressure control means to control the pressure of the said supply of fluid to the said enclosed volume in dependence upon the said measured pressure.

11. The fluid bearing of claim 1, in which the base comprises a flange on the wall of an ion implanter process chamber.

12. The fluid bearing of claim 1, in which the fluid supplied to said enclosed volume is compressed air.

13. An ion implanter comprising:
   (i) an ion beam generator to generate a beam of ions to be implanted;
   (ii) a process chamber into which the ion beam is directed, the process chamber having a stator base thereon;
   (iii) a stator attached to the stator base providing a first planar fluid bearing surface extending in a direction of movement;

(iv) a moving member having a second planar fluid bearing surface extending over said first surface, said moving member being mounted to be movable relative to said stator in said direction of movement, said first and second bearing surfaces being adapted to allow the second surface to be supported spaced from said first surface by a bearing fluid, one of said stator and said stator base having a locating member extending normal to the plane of said first bearing surface and the other of said stator and said stator base having a recess shaped to receive said locating member;

(v) a fluid seal enabling said member to slide in said channel in said normal direction sealing off an enclosed volume between said member and said other of said stator and said stator base;

(v) a plurality of fixtures at respective points distributed in a plane parallel to said first bearing surface to fix said locating member and said other of said stator and said stator base together at said points to form said enclosed volume, the number of said fixtures being the minimum necessary so that the first planar bearing surface of the said stator remains undistorted, and a fluid controller controlling the supply of a fluid to said enclosed volume to maintain said first planar bearing surface undistorted under the loading of said moving member.

14. The ion implanter of claim 13, in which the locating member is generally U-shaped in section, and the recess is correspondingly generally U-shaped in section to receive the aid locating member.

15. The ion implanter of claim 14, wherein a base of the U-shaped locating member is arranged substantially perpendicular to said normal direction, and a corresponding base of said generally U-shaped recess is also arranged substantially perpendicular to said normal direction, the said enclosed volume being defined between the said base of the locating member and the said base of the recess.

16. The ion implanter of claim 13, in which the locating member defines an enclosed annulus in a plane perpendicular to said normal direction.

17. The ion implanter of claim 16, in which the stator is circular in a plane perpendicular to said normal direction, and the moving member is a rotor arranged to rotate relative to said stator about an axis parallel to said normal direction.

18. The ion implanter of claim 16, comprising three fixtures distributed in said plane parallel to said first bearing surface.

19. The ion implanter of claim 18, wherein the three fixtures are distributed equidistantly around said enclosed annulus.

20. The ion implanter of claim 13, in which the locating member is enclosed and is generally rectangular in a plane perpendicular to said normal direction.

21. The ion implanter of claim 13, further comprising means for evacuating a chamber volume which is at least in part enclosed by the stator and the said second planar fluid bearing surface of the moving member.

22. The ion implanter of claim 21, in which the fluid controller comprises a pressure transducer to measure the pressure within the said chamber volume, and a pressure control means to control the pressure of the said supply of fluid to the said enclosed volume in dependence upon the said measured pressure.

23. The ion implanter of claim 13, in which the fluid supplied to said enclosed volume is compressed air.

24. A fluid bearing comprising:

(i) a base;

(ii) a stator attached to the base providing a first fluid bearing surface extending in a direction of movement;

(iii) a moving member having a second fluid bearing surface extending over the said first bearing surface, said moving member being mounted to be movable relative to said stator in said direction of movement, said first and second bearing surfaces being adapted to allow the second bearing surface to be supported spaced from the said first surface by a bearing fluid, one of said stator and said base having a locating member extending in a direction of extension forming an obtuse angle with the direction of movement of the first bearing surface, and the other of the said stator and said base having a recess shaped to receive the said locating member;

(iv) a fluid seal enabling said member to slide in said recess in said direction of extension sealing off an enclosed volume between said member and said other of said stator and said base; and (v) a plurality of fixtures at respective points distributed in a plane perpendicular to said direction of extension to fix said locating member and said other of said stator and said base together at said points to form said enclosed volume, the number of fixtures being the minimum necessary so that the first bearing surface remains undistorted, and (vi) a fluid controller controlling the supply of a fluid to said enclosed volume to maintain said first bearing surface undistorted under the loading of said moving member, the strength of the locating member and the stator being sufficient to prevent distortion thereof under the influence of components of the loading of the said moving member in a direction perpendicular to the said direction of extension of the said locating member.

* * * * *